United States Patent
Zuccotti et al.

(10) Patent No.: US 7,791,219 B2
(45) Date of Patent: Sep. 7, 2010

(54) CONTROL SYSTEM FOR ELECTRICAL LOADS OF A VEHICLE

(75) Inventors: Saverio Zuccotti, Orbassano (IT); Walter Savio, Orbassano (IT)

(73) Assignee: C.R.F. Societa' Consortile per Azioni, Orbassano (IT)

( * ) Notice: Subject to any disclaimer, the term of this patent is extended or adjusted under 35 U.S.C. 154(b) by 890 days.

(21) Appl. No.: 11/545,717

(22) Filed: Oct. 10, 2006

(65) Prior Publication Data

US 2007/0090967 A1   Apr. 26, 2007

(30) Foreign Application Priority Data

Oct. 10, 2005   (EP)   ................... 05425710

(51) Int. Cl.
*B60L 1/00* (2006.01)
*G06F 1/16* (2006.01)
(52) U.S. Cl. ................. 307/10.1; 361/679.02
(58) Field of Classification Search ......... 307/9.1, 307/10.1, 10.8; 361/679.26, 679.02; 296/24.45, 296/37.8, 1.07
See application file for complete search history.

(56) References Cited

U.S. PATENT DOCUMENTS

| | | | |
|---|---|---|---|
| 6,700,310 B2 * | 3/2004 | Maue et al. ............. | 310/339 |
| 6,805,455 B2 * | 10/2004 | Nielsen et al. .......... | 359/877 |
| 7,042,115 B2 * | 5/2006 | Mizutani et al. ........ | 307/10.1 |
| 7,109,843 B2 * | 9/2006 | Nagai et al. ............. | 340/5.72 |
| 2003/0186652 A1 | 10/2003 | Hopf et al. | |
| 2005/0127122 A1 | 6/2005 | McKenzie et al. | |
| 2005/0164672 A1 | 7/2005 | Schwab | |

FOREIGN PATENT DOCUMENTS

| | | |
|---|---|---|
| DE | 101 42 967 | 3/2003 |
| DE | 20 2004 007 932 | 10/2005 |
| GB | 2 120 424 | 11/1983 |
| WO | 00/44591 | 8/2000 |

OTHER PUBLICATIONS

English Abstract of DE 101 42 967 dated Mar. 27, 2003.

* cited by examiner

*Primary Examiner*—Albert W Paladini
(74) *Attorney, Agent, or Firm*—Ladas & Parry LLP

(57) ABSTRACT

Described herein is a control system (1) for electrical loads (2) of a vehicle (3), in particular a motor car. The control system (1) comprises a plurality of wireless control devices (4) for controlling the electrical loads (3), configured for being arranged in a removable way in respective housing seats (5) and for functioning even when they are removed from their housing seats (5). Furthermore, the housing seats (5) and the control devices (4) are shaped so as to enable placing in a removable way of at least some of the control devices (4) in different housing seats (5).

15 Claims, 2 Drawing Sheets

CONTROL SYSTEM FOR ELECTRICAL LOADS OF A VEHICLE

The present invention relates to a control system for electrical loads of a vehicle.

The present invention finds advantageous, but not exclusive, application in the automotive field, to which the ensuing treatment will make explicit reference, without this implying any loss of generality.

As is known, modern motor cars are provided with a plurality of electrical loads, for example headlights, power windows, electrical actuators in general, electric motors in general, air-bags, pretensioners, electronic devices such as car radios, satellite navigators, etc., which are connected, through electrical wiring, to manual control devices, such as push-buttons, knobs, etc.

Said control devices are generally located in the front part of the passenger compartment of the motor car in a fixed position so as to be conveniently operable by the driver or at the most by the passenger sitting at his side. Consequently, the occupants of the rear seats do not generally have access to any of said control devices, with the exception, in upper-range motor vehicles, of those for operation of the rear power windows, which are generally usually located in the rear door.

In view of the continuous increase in the number of electrical loads installed on board modern motor vehicles, and the consequent increase in the control devices necessary for their operation, there is consequently felt the need to develop technical solutions that will enable displacement within the vehicle of said control devices. This would enable or facilitate the interventions of personalization and ergonomic improvements, and would enable sharing, also with the occupants of the rear seats, of the possibility of actuating all those electrical loads that are not strictly linked to driving and that could thus be conveniently controlled by said occupants, without this, however, requiring a duplication of the control devices.

A duplication of the control devices, in fact, would reflect negatively upon the total cost of the motor car not only on account of the large number of control devices that it would be necessary to provide within the passenger compartment but also on account of the increase in electrical wiring that would derive therefrom.

The aim of the present invention is to provide a control system for electrical loads of a vehicle, which will enable the need referred to above to be met.

The above aim is achieved by the present invention in so far as it relates to a control system for electrical loads of a vehicle, in particular a motor car, as defined in claim 1.

Figure 1:
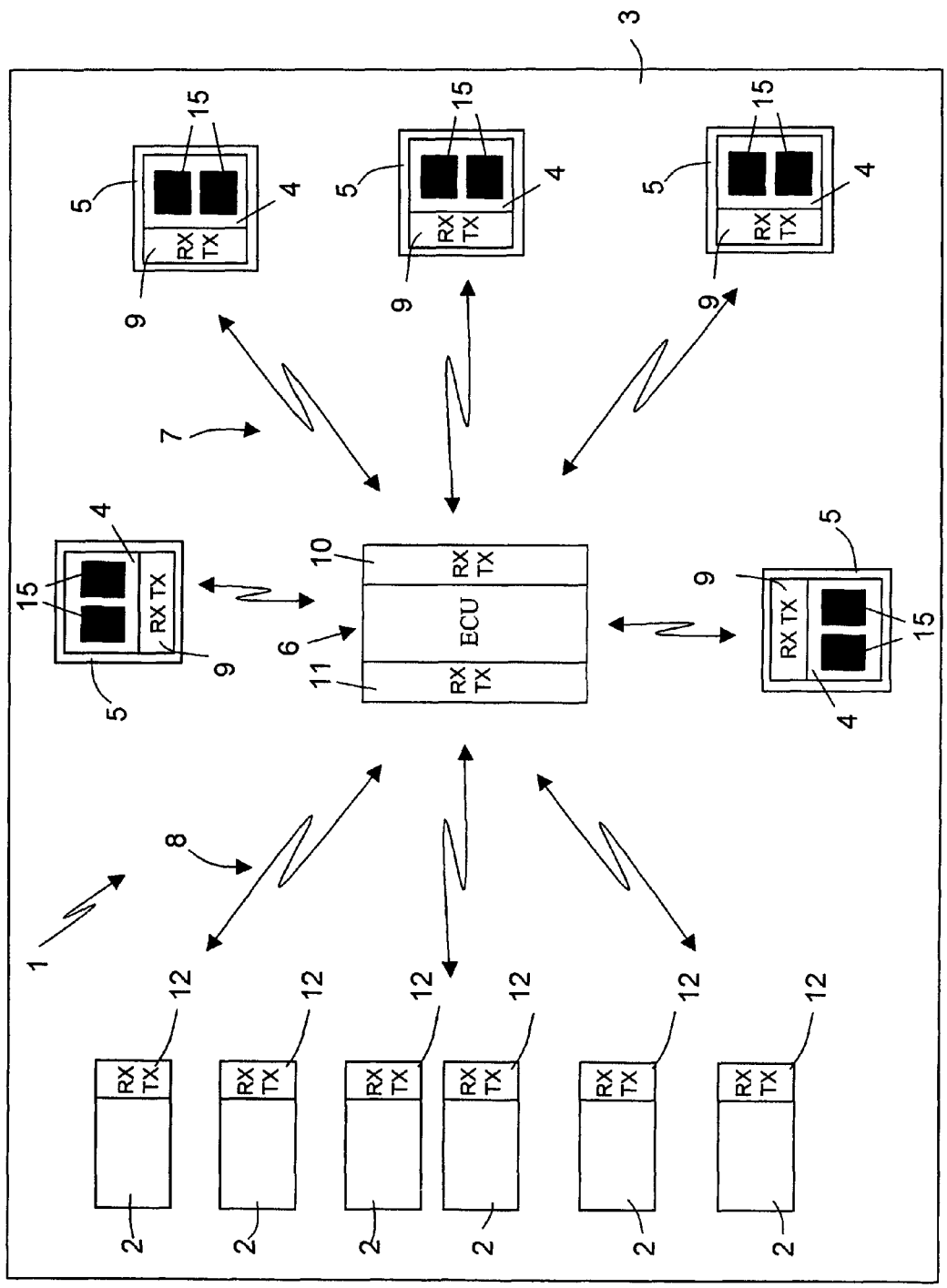
Figure 2:
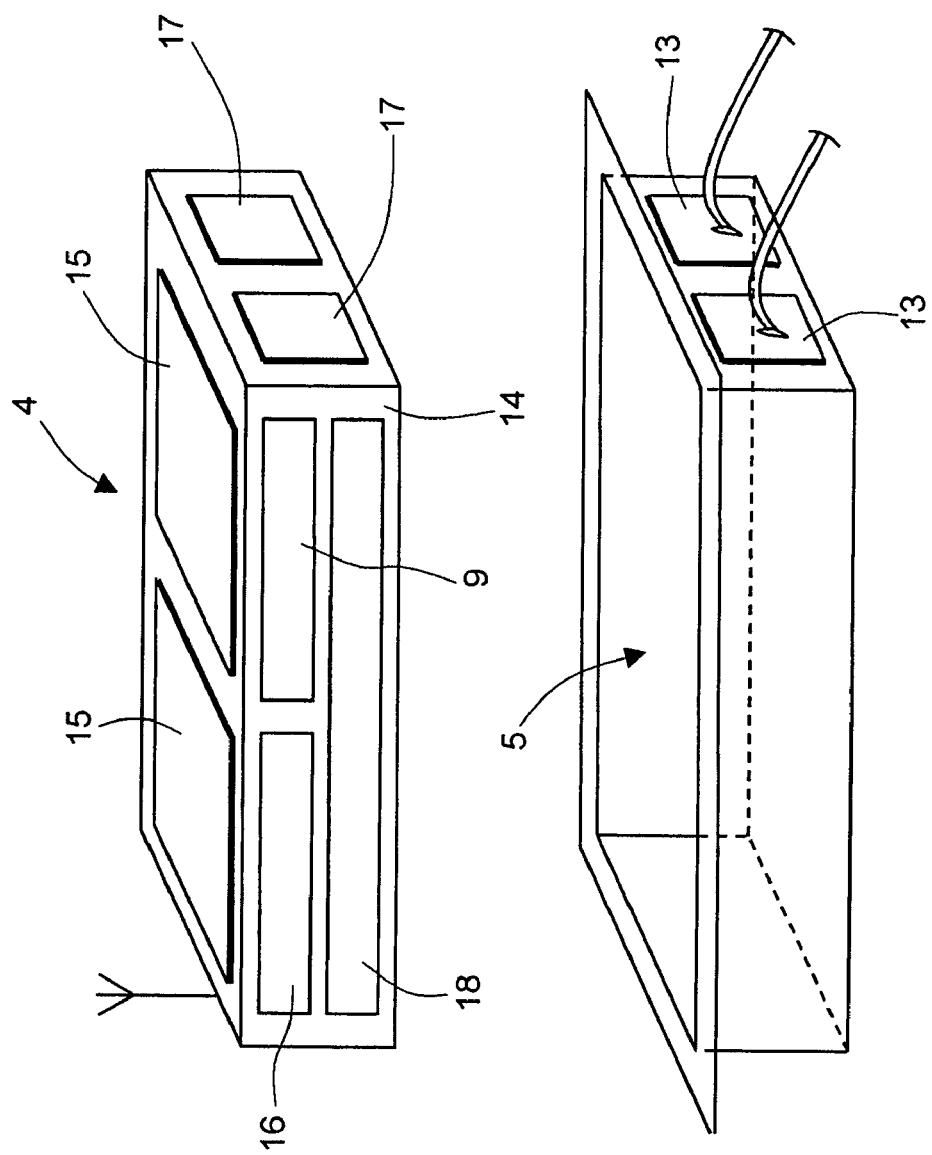

For a better understanding of the present invention, a preferred embodiment thereof is now described, purely by way of non-limiting example and with reference to the attached drawings, wherein:

FIG. 1 shows the block diagram of a control system for electrical loads of a motor vehicle according to the invention; and FIG. 2 shows a wireless device for controlling an electrical load and the corresponding housing seat within the passenger compartment of the motor vehicle.

Designated as a whole by 1 in FIG. 1 is a wireless control system for electrical loads 2 of a vehicle 3 (represented schematically), for example a motor vehicle, in particular a motor car.

In particular, the electrical loads 2 are generically constituted by any electrically controlled device, whether it is an electrical device, for example a headlight, an electronic device, for example a car radio, a satellite navigator, or the like, or else a mechanical/hydraulic/pneumatic device, for example a headlight-washer device, a power-window device, an internal or external rear-view mirror, an electric actuator or an electric motor in general, an air-bag, a pretensioner, or the like.

With reference again to FIG. 1, the control system 1 comprises:

a plurality of control devices 4 configured for being arranged possibly in appropriate housing seats 5 provided inside the passenger compartment of the motor car in positions established by the manufacturer of the motor car in the step of design thereof;

an electronic control unit 6 configured for controlling the operating state of the electrical loads 2 in response to operation of the control devices 4;

a first wireless-communication system 7 configured for enabling a communication between the control devices 4 and the electronic control unit 6; and a second wireless-communication system 8 configured for enabling a communication between the electronic control unit 6 and the electrical loads 2.

In particular, the first communication system 7 comprises:

a plurality of transceiver modules 9 each carried by a respective control device 4 and configured for transmitting to the electronic control unit 6 the control signals generated by the control devices 4 themselves and receiving from the electronic control unit any possible state signals that are generated and transmitted by the electrical loads 2 (when provided for said purpose) and indicate their operating state (on/off, etc.); and a transceiver module 10 carried by the electronic control unit 6 and configured for receiving the control signals generated and transmitted by the control devices 4 and transmitting to the latter any possible state signals generated and transmitted by the electrical loads 2.

The second communication system 8 comprises:

a transceiver module 11 carried by the electronic control unit 6 and configured for transmitting to the electrical loads 3 the control signals generated by the control devices 4 and receiving from the latter any possible state signals; and a plurality of transceiver modules 12, each carried by a respective electrical load 2 and configured for receiving the control signals transmitted by the electronic control unit 6 and generated by the control devices 4 and transmitting to the electronic control unit 6 any possible state signals generated by the respective electrical loads 2.

From the foregoing description, it immediately appears clearly evident to the person skilled in the art how the transceiver modules 10 and 11, although described and illustrated as distinct for reasons of convenience, are in actual fact constituted by a single transceiver module such as to enable the electronic control unit 6 to communicate on the one hand with the control devices 4 and on the other with the electrical loads 2.

The electronic control unit 6 performs the task of receiving the control signals transmitted by the control devices 4, identifying, on the basis thereof, the electrical loads 2 to be actuated, and transmitting said control signals to the corresponding electrical loads 2. Furthermore, the electronic control unit 6 performs the task of receiving any possible state signals transmitted by the electrical loads 2, identifying, on the basis thereof, the control devices 4 to which they are to be sent, and sending said state signals to the corresponding control devices 4, for example for activating possible devices (display, LED) for displaying the operating state of the corresponding electrical load 2.

In order to enable the electronic control unit 6 to identify from which control devices 4 the control signals arrive and to which electrical loads 2 said control signals are to be sent, and from which electrical loads 2 state signals arrive and to which control devices 4 said response signals are to be sent, the control signals transmitted by the control devices 4 and the state signals transmitted by the electrical loads 2 are encoded in a unique way.

According to a preferred embodiment of the invention, the wireless-communication systems 7 and 8 are both based upon the communication technology known as Bluetooth™, which is particularly indicated for complex connection and control applications and, in addition to being indicated for replacing completely, or at least in part, the connections to the electrical loads 2, also enables hands-free commands (for example commands of a vocal type) to be issued.

The communication protocol and the format of the data packet of Bluetooth™ technology is the following:
Band: ISM
Number of simultaneously active channels: max. 8
Data throughput: 720 kbps (approximately)
Voice throughput: 280 kbps (approximately).

In a different embodiment of the invention, the wireless-communication system 8 (and possibly also the wireless-communication system 7) is based upon the communication technology known as ZigBee™, which is devised principally for applications of command and control and hence is particularly indicated for replacing completely, or at least in part, the connections to the electrical loads 3.

ZigBee™ technology has a protocol suitable for management of simple devices, with low energy consumption and involving a high number of nodes, whilst Bluetooth™ technology is used for those applications that require a greater data-transfer capacity.

In particular, the communication protocol and the format of the data packet of ZigBee™ technology is the following:
Band: ISM and around 900 MHz
Number of simultaneously active channels: max. 256
Data throughput: 250 kbps (approximately)
Voice throughput: 0 kbps (i.e., it does not have a channel pre-arranged/dedicated for voice transfer).

In this embodiment, the electronic control unit 6 must possibly be configured for converting the control signals coming from the control devices 4 and encoded according to the protocol of the first wireless-communication system 7 (Bluetooth™, in the example) into the format recognized by the second wireless-communication system 8 (ZigBee™, in the example).

With reference to FIG. 2, each housing seat 5 is provided with a pair of electrical contacts 13 connected to an external electric-power source (not illustrated), for example the battery of the motor car, and is configured for receiving and withholding in a releasable way a respective control device 4. For said purpose, each housing seat 5 could be provided with a fixing mechanism of the snap-action type or of the interference-fit type or else of a magnetic type, or any other known mechanism suitable for the purpose, configured for co-operating with a complementary mechanism carried by the control device 4.

Each control device 4 comprises a casing 14 configured in such a way as to enable stable fixing of the control device 4 within the respective housing seat 5 and its simple removal from said housing seat 5; in particular, it is provided with a fixing mechanism configured so as to co-operate with the one provided in the housing seat 5 for withholding the control device 4 within the housing seat 5 itself.

The casing 14 of the control device 4 moreover carries:
the transceiver module 9 through which the control device 4 communicates with the electronic control unit 6;
a man-machine interface 15 configured for enabling a user to activate/de-activate a corresponding electrical load 2, for example, constituted simply by one or more elements for control of the electrical load 2, such as push-buttons, knobs, voice-control devices, etc. (for example, the control push-button of the power window, or else the knob for adjustment of the position of the external rear-view mirrors, the knobs and/or the push-buttons for regulation of the air conditioner, the front panel of the car radio, etc.), and possibly by one or more display elements through which the user can be informed on the operating state of the electrical load 3 (for example, a simple LED for indicating the activated/de-activated state of the electrical load 3, or else the display present in the front panel of the car radio, etc.);
an autonomous supply device 16, for example a rechargeable battery;
a pair of electrical contacts 17 configured for enabling connection of the control device 4 to the pair of electrical contacts 13 carried by the housing seat 5, thus enabling recharging of the supply device 16 when the control device 4 is inserted in the housing seat 5; and
a control unit 18 connected to the transceiver module 9, the man-machine interface 15, the supply device 16, and the electrical contacts 17 and configured for managing communication with the electronic control unit 6, the man-machine interface 15, and the means for recharging the supply device 16.

Thanks to the presence both of electrical contacts 13, 17 and of the autonomous supply device 16, said supply device being connectable to the battery of the motor car 3 through said contacts 13, 17 and rechargeable via the battery itself, the control device 4 is supplied by the battery of the motor car 3 when it is set in the corresponding housing seat 5, whilst it is supplied by the autonomous supply device 16 when it is removed from the corresponding housing seat 5, thus functioning in the wireless mode both when it is inserted in the corresponding housing seat 5 and when it is removed therefrom, operating, in the latter case, practically like a remote control through which it is possible to actuate the corresponding electrical load 2.

In this way, then, the driver of the motor car 3 or the passenger at his side can at any moment take a control device 4 out of the corresponding housing seat 5 and "pass it" to one of the occupants of the rear seats, who can then activate/de-activate, and more in general interact with, the electrical load 2 controlled by said control device 4.

This function of remote control of the control devices 4 proves particularly useful, for example, for enabling the occupants of the rear seats to operate the rear power windows of the motor car via control devices 4 that the manufacturer of the motor car has placed, for other reasons, in the front part of the motor car 3, or else to enable the occupants of the rear seats to interact with the car radio, which, as is known, is typically set on the dashboard of the motor car, it being thus possible to turn the volume up or down, change station or piece of music, etc.

According to a further aspect of the invention, the shapes and dimensions of the housing seats 5 and of the casings 14 of the control devices 4 are designed to enable removable location of some or all the control devices 4 also in housing seats 5 different from the ones that the manufacturer had envisaged for them in the stage of design of the motor car 3.

For example, the shapes and dimensions of the housing seats 5 and of the casings 14 of the control devices 4 could be designed according to a principle of modularity, and inside the passenger compartment of the car 3 there could be provided a number of housing seats 5 such as to enable placing of some or all of the control devices in a number of points of the passenger compartment of the car.

By way of example, a number of seats 5 for housing the control push-buttons for operating the power windows could be provided, for example, four in the central tunnel and other four in the doors, a number of seats for housing the knob for adjustment of the position of the external rear-view mirrors, for example one in the front right door and one in the central tunnel, a number of seats for housing the front panel of the car radio, for example one in the front part and one in the rear part of the passenger compartment, a number of seats for housing the knobs and/or push-buttons for adjusting the air-conditioning system, for example, one in the front part and one in the rear part of the passenger compartment, and so forth.

In order to reduce the aesthetic impact of the housing seats 5 on the passenger compartment of the vehicle, it is possible to envisage the use of hide-away surfaces designed to mask the housing seats 5 themselves when they do not house any control device 4.

In this way, the driver and/or passengers of the motor car 3 can modify the arrangement of the control devices 4 when they buy the car 3 itself according to his/their own habits or to specific requirements deriving from particular physical conditions. In this way, the four control push-buttons 4 of the front and rear right and left power windows provided initially by the manufacturer in the central tunnel of the motor car can, for example, be displaced onto the front and rear right and left doors, in such a way as to allow all the occupants of the vehicle to control their own power windows, as likewise the knobs and/or push-buttons for adjusting the air-conditioning system can be displaced into the housing seats provided in the rear part of the motor car, or else the front panel of the car radio can be displaced into the housing seat provided in the rear part of the motor car, etc.

The above hence enables a high flexibility in the personalization of the inside of the motor car, with consequent benefits in terms of comfort for the passengers.

On the basis of what has been described above the advantages of the control system 1 according to the present invention are evident.

In particular, the present invention enables the occupants of the rear seats of a motor car to actuate all the electrical loads that are not strictly linked to driving, without disturbing the driver and without requiring a duplication of the control devices, with consequent benefits in terms of costs of the motor car and of safety of driving.

Furthermore, the present invention enables a high flexibility in the personalization of the inside of the motor car, with consequent benefits in terms of passenger comfort.

In addition, the present invention enables:
- complete elimination of wired connections, with a consequent reduction in the total weight, the overall dimensions and the costs associated to the electrical wiring and to the installation/maintenance procedures;
- improvement of the flexibility of the network on the vehicle;
- provision, in the case where the Bluetooth™ protocol is used, of commands that can be managed by the driver in a vocal way so that he will not be required to take his hands off the steering wheel or his eyes off the road; and
- implementation of new functions on board the vehicle when the system is not provided with particular pre-arrangements.

Finally, it is clear that modifications and variations can be made to the control system described and illustrated herein without thereby departing from the scope of the present invention, as defined in the annexed claims.

For example, all the electrical loads 2 could be controlled, instead of via a single electronic control unit 6, through a number of distinct interconnection devices, or else be connected to the electronic control unit 6 in a wired, instead of wireless, way.

In addition, the wireless communication technologies used may be different from those described. In particular, instead of using a short-range wireless communication technology, medium-range or long-range wireless-communication technologies could be employed, such as for example Wi-Fi, IrDA (infrared), etc.

Furthermore, in the case where the aim is not to supply indications on the operating state of the electrical loads 2, the transceiver modules provided on the control devices 4 and on the electrical loads 2 can be replaced with transmitting modules present on the control devices 4 and with receiving modules present on the electrical loads.

Finally, the control system according to the invention could be used not only on motor vehicles, but on any type of vehicle, for example ships, trains, planes, etc.

The invention claimed is:

1. A system for controlling an electrical load of a vehicle, comprising a device for controlling said electrical load configured for being set in a housing seat provided on said vehicle, wherein said control device is of a wireless type, and is configured for being arranged in said housing seat in a removable way and for functioning even when said control device is removed from said housing seat;
   and at least one further housing seat provided in said vehicle, said housing seat and said control device being shaped so as to enable placement of said control device in a removable way also in said further housing seat.

2. The control system according to claim 1, further comprising:
   electronic-control means for controlling said electrical load; and
   a first wireless-communication system for enabling a communication between said control device and said electronic-control means.

3. The control system according to claim 2, in which said first communication system comprises:
   first transmitting means carried by said control device for transmitting to said electronic-control means control signals for said electrical load generated by the control device itself; and
   first receiving means carried by said electronic-control means for receiving said control signals for said electrical load and transmitted by said control device.

4. The control system according to claim 2, further comprising a second wireless-communication system for enabling a communication between said electronic-control means and said electrical load.

5. The control system according to claim 4, in which said second communication system comprises:
   second transmitting means carried by said electronic-control means for transmitting to said electrical load said control signals transmitted by said control device; and
   second receiving means carried by said electrical load for receiving said control signals transmitted by said electronic-control means.

6. The control system according to claim 5, in which said second communication system further comprises:
   third transmitting means carried by said electrical load for transmitting state signals indicating its own operating state; and
   third receiving means carried by said electronic-control means for receiving said state signals transmitted by said electrical load;

and in which said first communication system comprises:
- fourth transmitting means carried by said electronic-control means for transmitting to said control device said state signals transmitted by said electrical load; and
- fourth receiving means carried by said control device for receiving said state signals transmitted by said electronic-control means.

7. The control system according to claim 4, in which said first and second communication systems are based upon at least one of the following technologies: Bluetooth™, Zig-Bee™, and Wi-Fi.

8. The control system according to claim 1, in which said control device comprises:
- man-machine-interface means configured for enabling a user to control said electrical load; and
- electrical-supply means configured for enabling operation of said control device both when said control device is set in said housing seat and when said control device is removed from the housing seat.

9. The control system according to claim 8, in which said electrical-supply means comprise:
- autonomous electrical-supply means; and
- electrical-connection means configured for connecting said control device to an electric-power source of the vehicle and recharging said autonomous electrical-supply means when said control device is set in said housing seat.

10. The control system according to claim 9, in which said housing seat comprises:
- electrical-connection means configured for connecting said control device to said electric-power source of the vehicle.

11. The control system according to claim 8, in which said man-machine-interface means comprise:
- at least one control element for controlling said electrical load.

12. The control system according to claim 11, in which said man-machine-interface means further comprise:
- means for display of information indicating the operating state of said electrical load.

13. A vehicle comprising at least one electrical load and a control system for controlling said electrical load according to claim 1.

14. The vehicle according to claim 13, said vehicle being a motor vehicle.

15. The vehicle according to claim 14, said vehicle being a motor car.

* * * * *